Figure 3:
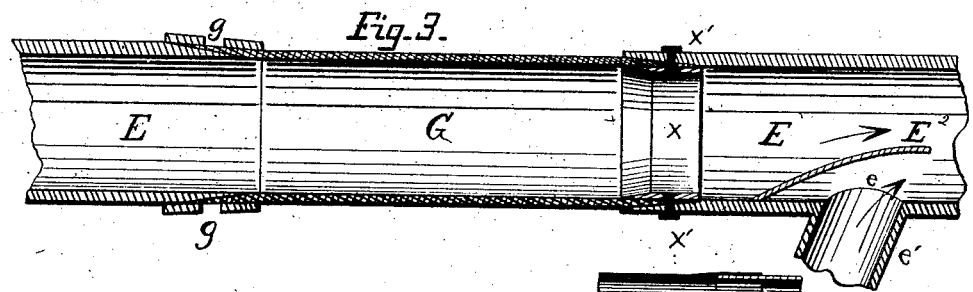

(No Model.)
4 Sheets—Sheet 1
J. RAWLE.
COTTON HARVESTER.
No. 362,588.
Patented May 10, 1887.
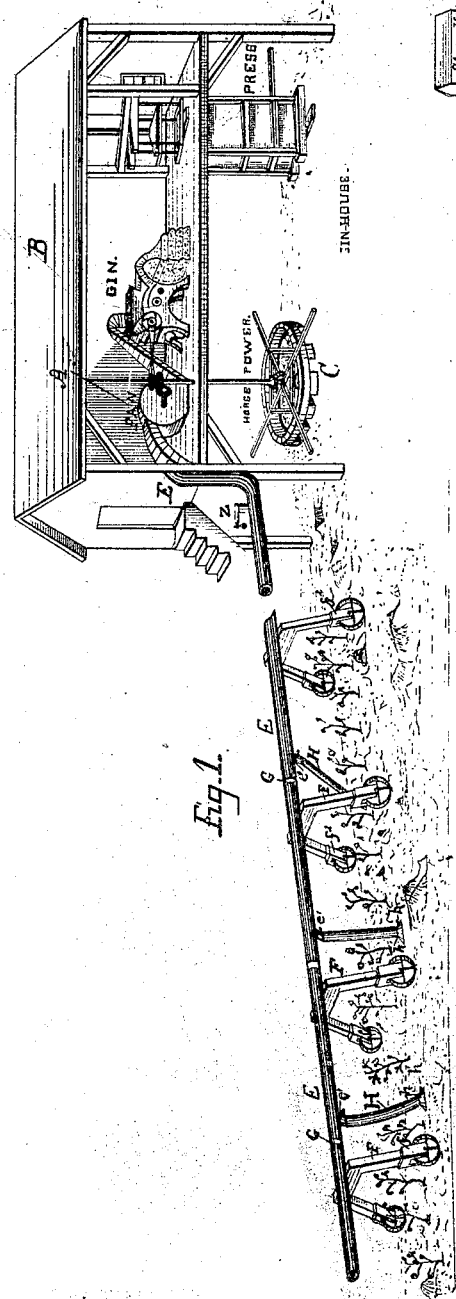
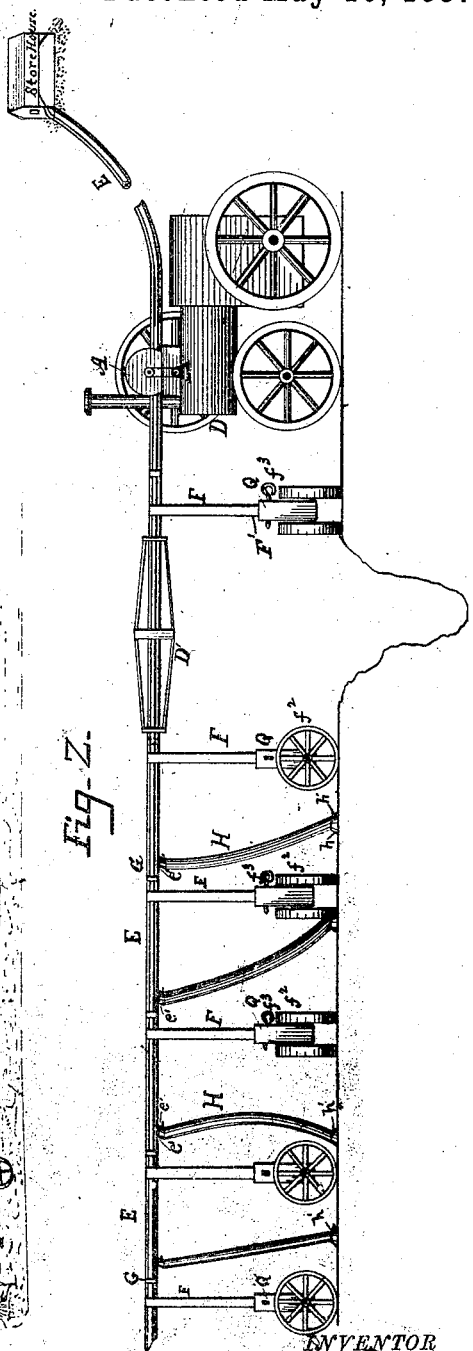
WITNESSES
J. B. Johns
Wm. H. Brereton
INVENTOR
James Rawle
by Henry Wise Garnett
Attorney (No Model.)　　　　　　　J. RAWLE.　　　　4 Sheets—Sheet 2.
COTTON HARVESTER.

No. 362,588.　　　　　　Patented May 10, 1887.

WITNESSES
J. D. Johns
Wm. H. Brereton

INVENTOR
James Rawle
by Henry Wise Garnett
Attorney (No Model.) 4 Sheets—Sheet 3.
J. RAWLE.
COTTON HARVESTER.
No. 362,588. Patented May 10, 1887.
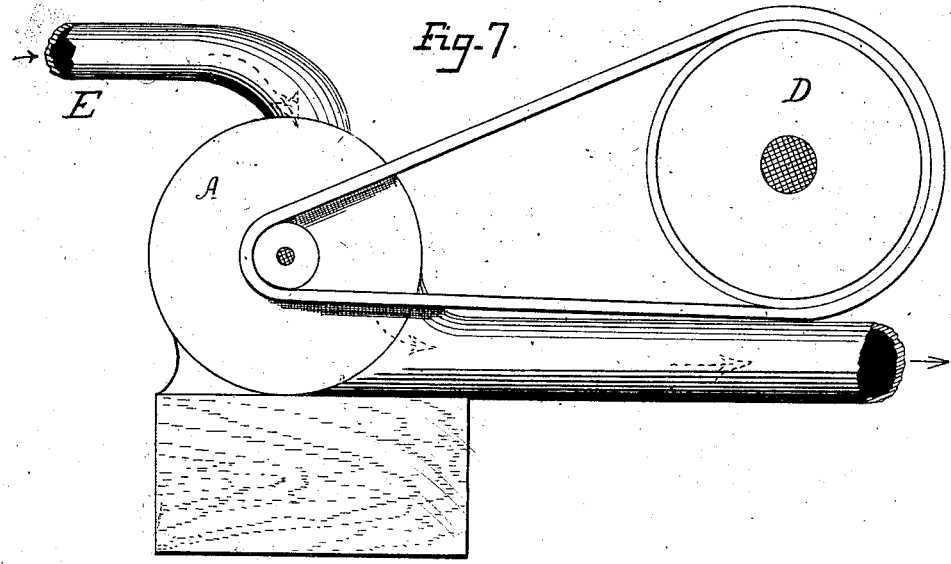
Fig. 7.
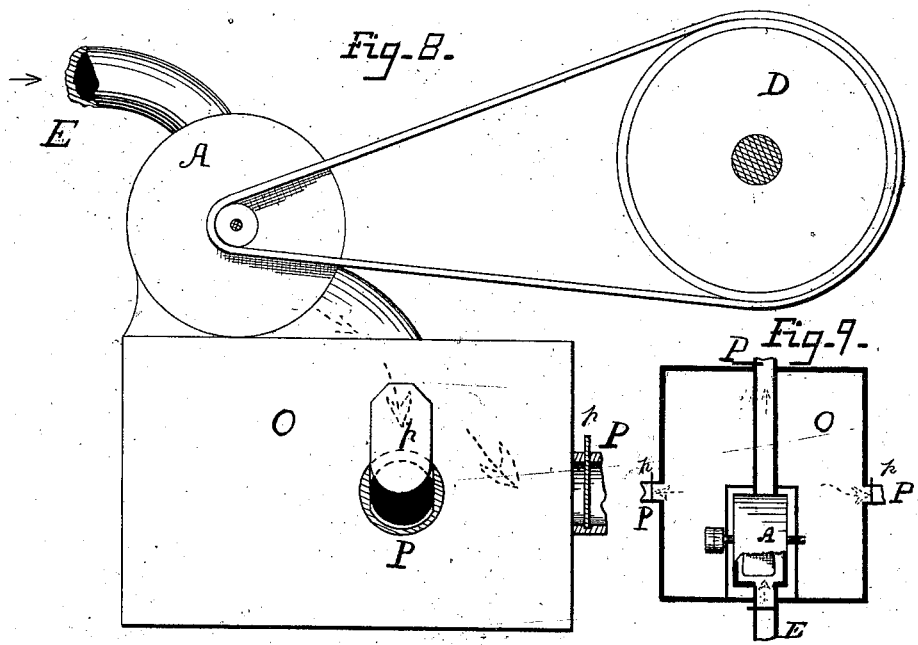
Fig. 8.
Fig. 9.
WITNESSES
J. B. Johns,
Wm. H. Brereton
INVENTOR
James Rawle
Henry Wise Garnett
Attorney (No Model.)

J. RAWLE.
COTTON HARVESTER.

No. 362,588. Patented May 10, 1887.

WITNESSES
J. O. Johns
Wm H. Brereton

INVENTOR
James Rawle
By Henry Wise Garnett
Attorney

UNITED STATES PATENT OFFICE.

JAMES RAWLE, OF PHILADELPHIA, PENNSYLVANIA.

COTTON-HARVESTER.

SPECIFICATION forming part of Letters Patent No. 362,588, dated May 10, 1887.

Application filed August 3, 1886. Serial No. 209,926. (No model.)

*To all whom it may concern:*

Be it known that I, JAMES RAWLE, a citizen of the United States, residing at Philadelphia, in the county of Philadelphia and State of Pennsylvania, have invented certain new and useful Improvements in Cotton-Harvesters or Apparatus and Method of Gathering Cotton; and I do hereby declare the following to be a full, clear, and exact description of the invention, such as will enable others skilled in the art to which it appertains to make and use the same.

My invention relates to improvements in cotton-harvesters; and my said invention consists in certain details of construction and arrangement of the parts composing a cotton harvester or apparatus for facilitating the gathering of the same when constructed according to my invention, whereby to accomplish the desired end—viz., conveying the cotton directly from the plant in the field to the gin or storage house without rehandling—as will be hereinafter more particularly described, and pointed out in the claims.

As now most generally practiced, the harvesting or "picking," as it is called, of cotton is performed by hand, the ripe cotton first being detached from the bolls by the hands of the laborer and deposited in a basket or bag carried at his side, which receptacle, when full, is conveyed to and its contents emptied into a cart or other vehicle, which passes back and forth over the field among the pickers, and when having received its load is driven off to the store or gin house at the entrance to which the cotton is deposited, to be by other attendants removed within the house and piled adjacent the ginning-machine for feeding thereto. It will thus be seen that the cotton is subjected to several handlings before it reaches the gin, during which it receives considerable dirt, sand, &c., because of being brought into contact with the ground, feet of the laborers, floor of vehicle, &c., and to free it from which impurities expensive machines have been devised. Aside from this a great item in the cost of cotton is due to the time consumed in its picking, and the greatest amount of time consumed is that expended in carrying the contents of the basket or bag of the pickers to the cart or vehicle, and thence to the place of deposit outside of the field; and again, in addition to this loss of time and admixture of dirt consequent upon repeated handlings of the cotton, much of it gets injured as well as scattered about and lost at each of said rehandlings, thus making an additional and no small item in the prime cost of the staple.

With a view of facilitating the gathering of cotton, and thereby effecting a saving in the cost thereof by overcoming the loss of time of the pickers in passing to and from the delivery-carts, various forms of machines more or less complicated and expensive have been devised, in some of which the cotton was removed from the plant by mechanical means and without the intervention of the human hands, and in others suction or blast, or both combined, operating through a tube which was presented to the cotton-boll, has been employed both to pick and convey the cotton as it was removed from the plant to suitable receptacles close at hand; but in all such instances, so far as I can learn, the machines were portable—that is, designed to be moved back and forth over the field as the picking progressed, and whether the devices for picking the cotton were in such machines mechanical ones or a pipe through which an air-current was created by suitable means situated upon the said machine the operation intended to be performed thereby was that merely of picking, the cotton only being conveyed from the plant to suitable receptacles situated upon the frame of said machine, which was run close adjacent the rows of plants, from whence as it accumulated it was conveyed by the usual carters to the gin or storage house outside of the field. In other words, all machines heretofore designed for harvesting cotton have only been directed to the single operation of picking, so that even though a saving may have been effected as regards the movements to and from the delivery-carts of the laborers, yet the services of said carts, with the attendant expense thereof and objections as to rehandling of the cotton and collection of dirt therein, were not dispensed with, and besides this nearly all such machines were more or less complicated, expensive both as to first cost and cost of running, as well as exceedingly heavy, especially so when the apparatus comprehended the employment of a tube with air-current therein because of an engine or similar machine with its appurtenances of fan, boiler, pump, furnace, &c., being necessary in such an apparatus for creating the necessary air-current, so that considerable power was required to move such machine and skilled service necessary in their attendance.

To overcome the several objections herein enumerated—viz., the loss of time by the pickers in passing to and from the delivery-carts and the carters in going to and from the storage-house or place of deposit, as well as the expense of said teams and their attendants with the attendant loss and injury of the cotton by such rehandlings—is the object of my invention, now to be described in detail, and by which it is proposed to render practicable and within the reach of planters of moderate means the use of a current of air for taking the cotton from the hands of the human pickers and quickly delivering it to either the storage or gin house, or, better still, directly into the mouth of the ginning-machine, without any handling other than that necessary in its picking, which handling has been demonstrated by practical experience to be necessary, because of the peculiarities which exist in the growth and ripening of cotton being such as to render impracticable the use of purely mechanical means for extracting the ripe cotton from the plants without injuring the plants and unripe cotton, and obtaining only that which is ready for picking.

In carrying out my invention I proceed as follows, reference being now directed to the accompanying drawings for a better understanding of the details of construction and arrangement of the parts composing a machine or apparatus for harvesting cotton when constructed according to my invention, and in which drawings—

Figure 4:
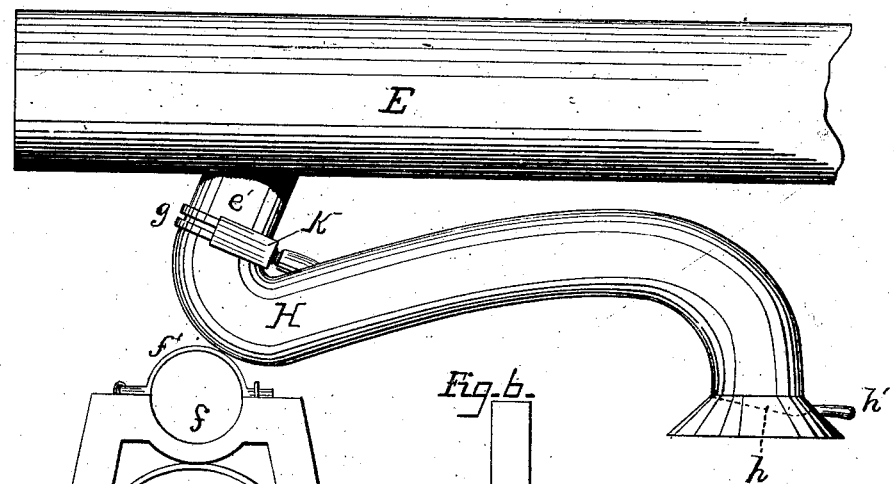
Figure 5:
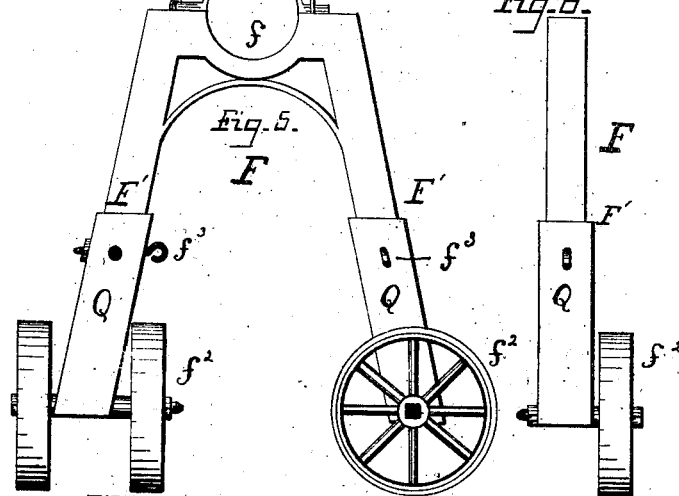
Figure 6:
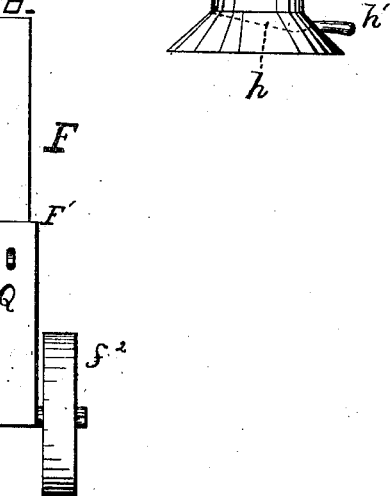
Figure 11:
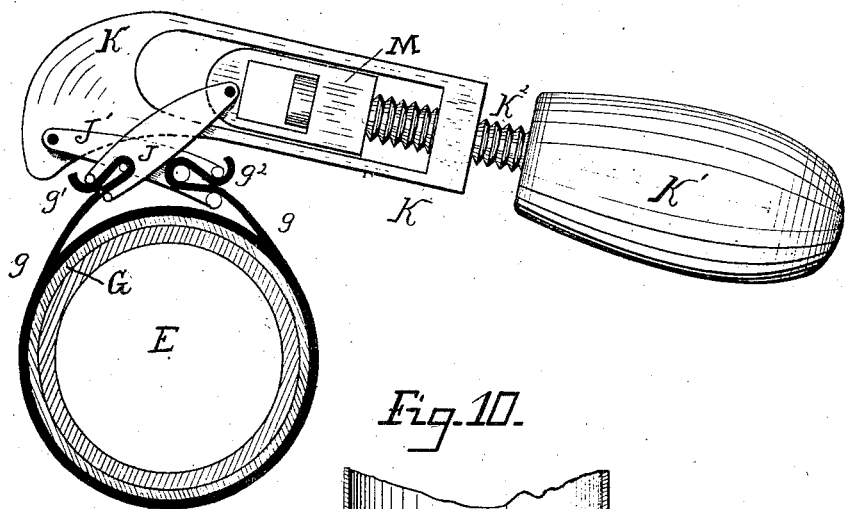
Figure 10:
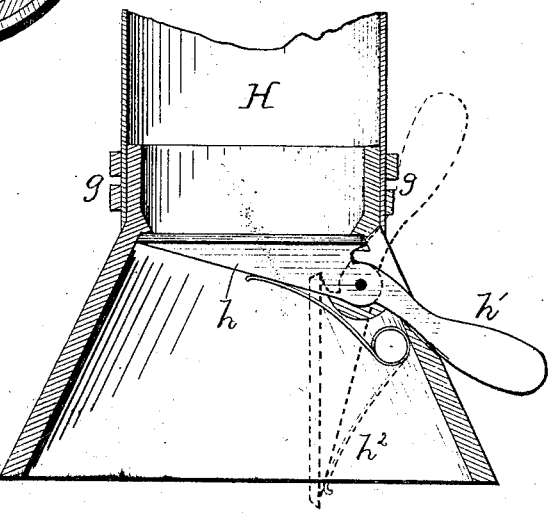

Figure 1 represents a view in perspective of a portion of a cotton-field, along the top of one of the rows of cotton-plants of which is arranged a line of pneumatic tubing which extends to near the outer end of said row and at its other end terminates in a fan arranged within the distant gin-house. Fig. 2 is a similar view showing the line of tubing spanning a ravine or other depression or road across the field, and having a portable engine and fan driven thereby interposed in its length between the field and house to facilitate the conveyance of the cotton thereto in case the same is unusually distant or difficult of access. Fig. 3 represents a central longitudinal sectional elevation of a portion of the adjacent ends of two sections of the tubing, illustrating the joints or connections thereof, as also the formation of the entrance in said tubing for the depending flexible hand-pipe. Fig. 4 is a view in side elevation of a portion of one of the sections of tubing with its depending flexible hand-pipe, showing the manner of uniting said pipe to the tube by means of the hand-clamp. Figs. 5 and 6 illustrate a face and edge view, respectively, of one of the movable roller bracket-bearings for the tubing, showing the construction of the same. Fig. 7 is a view of a portion of the end of the pneumatic conduit-tube, showing the manner of attaching the fan thereto. Figs. 8 and 9 represent a side elevation and plan, respectively, of a portion of the said tubing with fan attached, illustrating the said fan as connected to a receiving receptacle for the cotton adjacent the casing of said fan. Fig. 10 is a sectional view, on an enlarged scale, of the mouth of the hand-pipe, showing the valve therein. Fig. 11 is a view, on an enlarged scale, of the hand-clamp and metal band for effecting the union of the joints between the sections of tubing and tube and hand-pipes.

A rotary or other fan, as at A, which may be either an exhaust or blast fan, or the equivalent of either for obtaining a strong current of air, is suitably set up in the gin-house B, or other house or suitable place outside of the cotton-field, and arranged to be driven by power, either the usual horse-power, C, or an engine, D.

Attached to one side of the casing of the fan is the line of tubing E, preferably made of galvanized sheet-iron, the tube being of suitable diameter and made in conveniently portable lengths, probably about twelve feet each section. This line of tubing is supported on light strong frames F, made preferably of malleable iron, which will have a span of about five feet at the bottom extremities and one and one-half or two feet at their top end, with a depression in the top to receive the tubing, and, if need be, a hasp to secure the tubing in place. The bottom ends of these supports F are provided with light wheels or casters $f^2$, about twelve inches in diameter, and with a rather broad tread or face to prevent their sinking in the soft earth, and they are of such width or span and height as to rest their wheels about midway between the rows of plants and to carry the tubing above or near the tops of said plants, the casters or wheels admitting of the supports being moved transversely to the rows of plants without material injury to the said plants.

Each section of the line of tubing is joined to the next one by a short piece of rubber, canvas, or other flexible tubing, as at G, which must be air-tight, or nearly so, care being taken in the fastening of such flexible joints to the metal tubing that no projection or shoulder shall exist inside the same opposed to the current of air, whereby the cotton may be caught or dammed, and in each of the said sections E, composing the line of tubing, at suitable intervals, probably every six feet, is formed an opening, as at $e$, with nipple $e'$, to which is attached a short piece of flexible or other pipe of suitable diameter, as at H, joining onto the main line of tubing at an angle, as shown in Fig. 4. This pipe H may be about six feet long, (more or less,) as seems desirable. At the farthest end from the line of tubing of these short pipes is a funnel-shaped mouth-piece containing a valve or gate, as at $h$, with lever $h'$, which lever, when the valve is open, will lie close to the short pipe, about in line with it, as shown in dotted lines of Fig. 10.

The main line of tubing should be of such length as to reach to the farthest end of the rows of plants, and the most economical method of operation will be to have the storage or ginning house in the center of the field, for in this way the line of tubing can be moved in a circle around the fan without difficulty.

In fields where the surface of the land is reasonably even and smooth there will be no difficulty in setting up the line of tubing and in moving it from row to row. Should there be gullies or hollows these may be crossed by a long section of rigid tubing having a truss-rod above and below and its ends resting on two of the supports, as at D', Fig. 2. In small fields, or in fields with decidedly uneven surface, it may be found best to use the fan in connection with a portable engine, as in Fig. 2, both fan and engine being placed outside the field of plants and provided with the discharge-box shown in Figs. 8 and 9, whereby the cotton may be collected at this point or conducted in a different direction, as desired or found necessary.

The supports, as well as tubing, are made in as light portable form as is possible consistent with the requisite strength, so as to render it easy of adjustment from row to row across the field or for transportation to and from the same, and also so that they may be readily taken down and stored in winter. Owing to the flexible joints, the line of tubing will adapt itself to slight inequalities in the surface of the ground and render its adjustments across the field easier of accomplishment because of said joints yielding and permitting the line of tubing to assume such curves or angles as may be found necessary in effecting a continuous communication from the cotton-field to the more or less remotely-situated place of deposit, and because of the cotton passing directly from the plant to the storehouse or into the ginning machine admixture of sand, dirt, &c., therewith is prevented, thus reducing the cost of cleaning the same.

In addition to the advantages derived by the use of such an apparatus herein described of facilitating the picking of the cotton from the plants and direct conveyance thereof to the gin-house, and prevention of admixture of dirt and injury and loss thereof, said apparatus is simple in construction and comparatively inexpensive as to first cost, for it only comprehends a fan or similar device, a sufficient number of tube-sections to reach from the gin-house to near the outer end of the field, with their depending flexible band-pipes and suitable movable supports therefor, and requiring neither skill nor unusual amount of labor in its management, and resulting in a large yearly saving in the cost of picking and harvesting.

Turning again to the drawings, in Fig. 3 the joint between two adjacent ends of the tubes E is shown as being effected by a short rubber or canvas tube, G, one end of which is fitted over the inner end of the tube E, and so held by double encircling-bands $g$ of a hand-clamp, K, Fig. 11, and the other end placed within the outer end of said tube E, to which it is secured by metal band and rivets, as at $x\ x'$, Fig. 3. This double overlapping band $g$, for securing the flexible joint to the line of tubing, is preferably made of spring metal passed twice around said flexible connection, and with its ends $g'\ g^2$, Fig. 11, held one in each of the jaws J J' of the hand-tool K; and this hand-tool is composed of a body or holder, K, handle K', with screw-shank $K^2$, carrying a swivel, M, at its outer end, and jaws or holders J J', pivoted, respectively, to the swivel M and the body or holder K of the implement, whereby the quick and secure clamping or instant disconnection of the flexible tube to the metal tube may be effected by a simple movement of the handle K', which, operating upon the pivoted holders J J' to extend or contract them, tends to tighten or loosen the bands $g$. Such a device may also be used for uniting the short flexible hand-pipes to the tubing, as shown in Fig. 4.

In Figs. 8 and 9 a discharge-box, as at O, is shown attached to the fan-case, or it may be at the point of discharge of the line of tubing, which is provided with one or more openings, as at P, to permit the discharge in different directions of the cotton from the said box, such openings being provided with sliding gates or valves, as at $p$, in order that either outlet may be closed to direct the cotton in a different direction.

To properly direct the cotton from the short pipes into the line of tubing, the projecting opening $e$ is arranged at an angle which inclines toward the outer end of the tubing, as shown in Fig. 3, and above this entrance, in the tubing E, is formed a deflector or partition, $E^2$, to insure the proper lateral draft into the line of tubing from the hand-tubes, so that the proper entrance and forward movement of the cotton are assured, and to prevent lodgment or damming of passing cotton in the opening $e$, especially of such hand-pipes as may be temporarily unemployed.

The mouth of the flexible hand-pipe is, as before stated, made funnel-shaped, as shown in Fig. 10, and within the same is a valve-gate, as at $h$, having a handle, $h'$, by which it is opened, and a spring, $h^2$, for closing the same when not in use.

The supports F, Figs. 5 and 6, for the tubing are, as before stated, preferably of malleable iron, light but strong, and of sufficient height and span to straddle the row of plants, with a recess or seat, $f$, within which is arranged a swivel-plate, $f'$, in its top to receive and hold the tubing, and the lower ends or legs, F', rounded into cylindrical shape and fitting into hollow cylinders Q, carrying the wheels $f^2$, whereby said wheels may be turned at different angles, and in which position they may be held by a through-bolt, $f^3$, or other similar means to prevent the accidental turning of said casters until desired for moving the line of tubing. To prevent the bursting of the tubing, it is proposed to arrange a safety-valve in said tube adjacent the fan or at some other convenient location, as in Figs. 1, 2; and, instead of securing one end of the flexible tube within the end of the metal tube by a band, as in Fig. 3, the end of the said flexible tube may be split and one part thereof placed within the metal tube, which will prevent a shoulder being formed in the said line of tubing, and the other part placed outside of the end of the tube and secured by the bands and hand-clamp, as on the opposite end of said flexible tube, as at Y, Fig. 3.

The operation is as follows: The fan or other device for obtaining a strong current of air through the tubing being first set in motion and a strong current of air created through said line of tubing, which had previously been arranged over the row of plants, as in Figs. 1 or 2, the usual picker will now grasp the short pipe H with one hand and with this same hand hold open the valve or gate at the funnel end and apply said funnel to the ripe boll of cotton. Simultaneously with this movement he will with the other hand loosen the cotton from the plant and direct it within the pipe, which cotton will then be forcibly drawn through said short pipe and into the line of tubing to the fan and forced thence either directly into the ginning-machine, as in Fig. 1, or the storage-house, as in Fig. 2, or into other suitable receptacles arranged ready to receive it. When each operative has picked all the ripe cotton within reach of the short pipe being worked by him, (and it is proposed to reach the plants within three rows,) they will drop the short tube, the spring-valve at the end of which closing said pipe automatically, and will then go to the next short pipe and continue the operation of picking. When all the ripe cotton within reach of the first position of the line of tubing has been gathered, all the operatives working on the line will take position one at each of the supports, and by pushing upon the same, as well as upon the line of tubing, said tubing will be adjusted to another set of rows of plants, and the process of picking repeated throughout the field until all is picked.

Having now fully disclosed the construction and operation of an apparatus for harvesting cotton when constructed according to my invention, I wish to here state that I do not confine myself to the use of an exhaust-fan, but may use a blast-fan or other means, the equivalent of either kind of fan, to obtain a strong current of air through the line of tubing; nor do I wish to be understood as laying any broad claim to the use of a tube with air current or blast therein, or both combined, for picking cotton when said tube is used in connection with and discharges the cotton directly upon a machine which was run over the field as the picking progressed and adjacent the row of plants being operated upon, and which machine carried the said line of tubing as well as the necessary machinery for producing the current of air in said tubing, as also receptacles for the cotton, for this has before been attempted; but What I do claim as new and of my invention is as follows, viz:

1. In an apparatus for harvesting cotton, the combination of a stationary storage or gin house, a line of pneumatic tubing temporarily stationary and extending across the cotton-field alongside the row of plants and formed in sections with flexible joints, and provided with depending flexible hand-pipes adapted to be presented to the different plants in the row, a suction-fan connected to said line of tubing, and suitable means for supporting the said tubing above the plants, substantially as described, for the purposes specified.

2. In an apparatus for harvesting cotton, the combination of a stationary storage or gin house, a line of pneumatic tubing temporarily stationary and extending across the cotton-field alongside the row of plants and formed in sections with flexible joints, and provided with depending flexible hand-pipes adapted to be presented to the different plants in the row, a suction-fan connected to said line of tubing, and a suitable receptacle for receiving the cotton from said tube, substantially as described, for the purposes specified.

3. In an apparatus for harvesting cotton, the combination of a stationary storage or gin house, a line of pneumatic tubing in sections having flexible joints extending from said storage or gin house to a second line of tubing temporarily stationary and extending across the cotton-field alongside the row of plants and formed in sections with flexible joints, and provided with depending flexible hand-pipes adapted to be presented to the different plants in the row, and a suction-fan with suitable motive power for the same interposed in the line of tubing between the store-house and cotton-field, substantially as described, for the purposes specified.

4. In an apparatus for harvesting cotton, the combination of a stationary storage or gin house, a suction-fan and ginning-machine arranged in said house, and a line of pneumatic tubing temporarily stationary and extending across the cotton-field alongside the row of plants and formed in sections with flexible joints, and provided with depending flexible hand-pipes adapted to be presented to the different plants in the row, said tubing being connected to said fan and discharging into the ginning-machine, substantially as described, for the purposes specified.

5. In an apparatus for harvesting cotton, in combination with the tube-section E, formed with angularly-placed nipple $c'$ and deflectingwall E², the flexible hand-pipe H, formed with a funnel-shaped mouth, $h$, carrying a spring-valve or gate, $h^2$, substantially as described, for the purposes specified.

6. In an apparatus for harvesting cotton, in combination with a line of tubing and suitable suction-fan, A, the discharge-box O, arranged adjacent said fan and provided with lateral openings P, substantially as described, for the purposes specified.

JAMES RAWLE.

Witnesses:
HENRY REED,
FRANCIS RAWLE.